United States Patent [19]

Kerney et al.

[11] Patent Number: 4,570,475

[45] Date of Patent: Feb. 18, 1986

[54] BRAKE SHOE RESIZER

[76] Inventors: Robert A. Kerney, 1500 De Shields Dr., Evansville, Ind. 47712; Alfred E. Hardy, 3112 Lincoln Ave., Evansville, Ind. 47714

[21] Appl. No.: 616,069

[22] Filed: Jun. 1, 1984

[51] Int. Cl.[4] .............................................. B21D 37/00
[52] U.S. Cl. ........................................ 72/412; 72/398; 72/471; 72/364; 72/377; 29/402.05; 29/402.21
[58] Field of Search ................. 72/398, 412, 413, 471, 72/364, 377; 29/402.04, 402.05, 402.19, 402.21, 150; 59/29

[56] References Cited

U.S. PATENT DOCUMENTS

| | | | |
|---|---|---|---|
| 1,964,584 | 6/1934 | Klocke | 72/398 |
| 2,144,321 | 1/1939 | Bauberger et al. | 72/389 |
| 2,612,205 | 9/1952 | Seibert | 72/398 |
| 2,878,854 | 3/1959 | Batcheller | 72/412 |

*Primary Examiner*—Daniel C. Crane
*Assistant Examiner*—David B. Jones
*Attorney, Agent, or Firm*—Warren D. Flackbert

[57] ABSTRACT

A brake shoe resizer characterized as a hydraulically operated die which includes a groove presenting a shape corresponding to the area of the ribs surrounding the openings for the brake shoe anchor pin. Guide and/or stop means are provided for positioning and/or checking purposes during the reworking operation. The latter includes introduction of a guide pin into the openings for the anchor pin and the successive reshaping of each such openings after the selective heating of the areas around the anchor pin openings prior to die or reforming action. The overall assembly further includes structure for reshaping the curvature of the brake shoe, if necessary, and, as well, the spacing between the ribs presented on the brake shoe.

7 Claims, 5 Drawing Figures

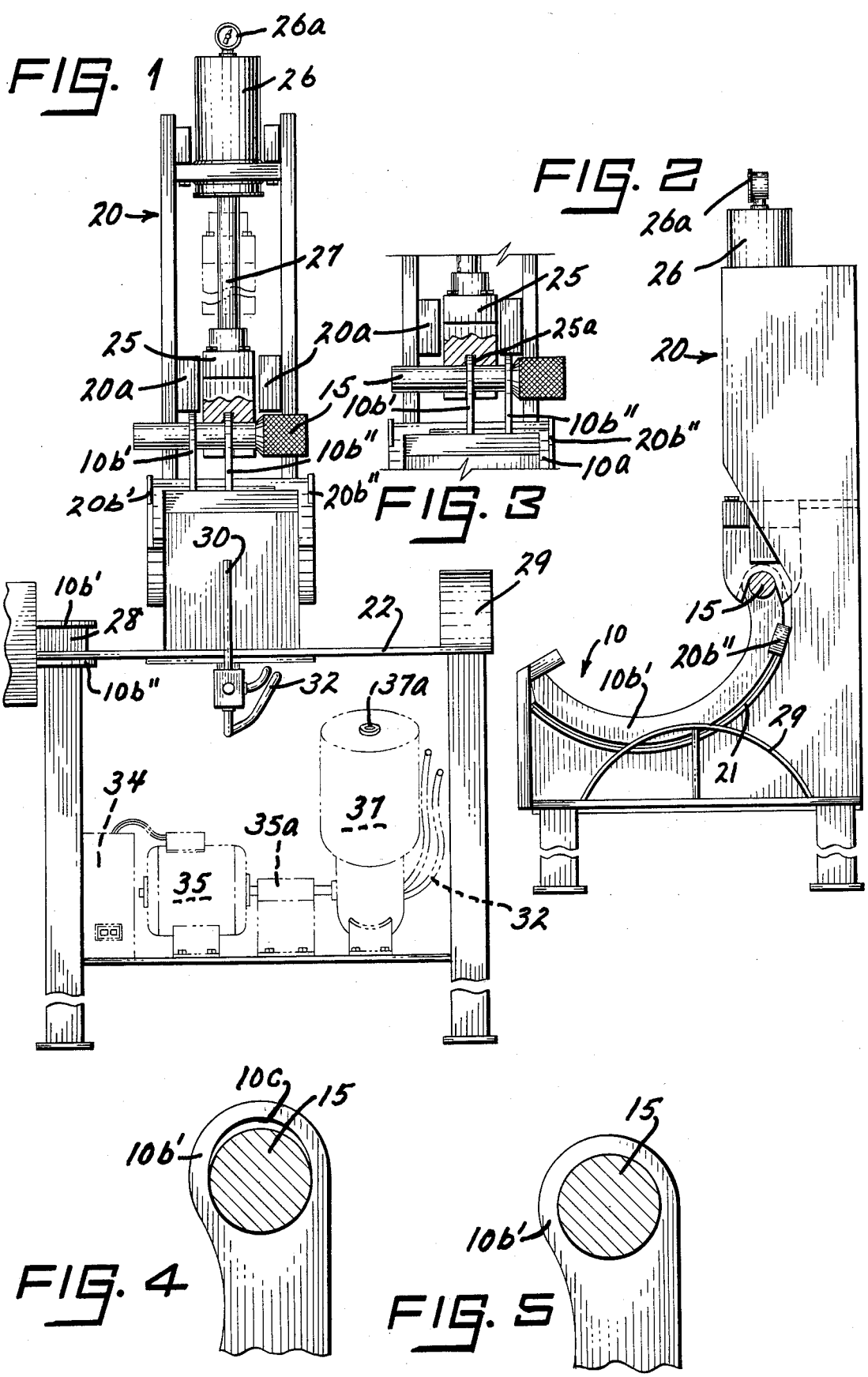

BRAKE SHOE RESIZER

As is known, the usage of brake shoes in combination with vehicle axles is widespread, typically employing an anchor pin for accomplishing pivotal movement during usage. A serious drawback, however, is that after periods of service, the holes which receive the anchor pin oftentimes become misshapen, with the latter mostly resulting in complete brake shoe replacement. In view of the expense involved, a need has arisen for reworking an existing and worn brake shoe at a single site which not only is capable of resizing the holes for the anchor pin but, as well, assures proper brake shoe curvature and spacing between the ribs through which the anchor pin openings or holes are disposed.

The invention satisfies the aforesaid purposes in presenting a brake shoe resizer which effectively serves the various reworking needs. Basically, the instant resizer arrangement involves a hydraulically operated die which receives, within a groove, one of the ribs and then the other of the ribs of the brake shoe, in successive operations, i.e. after each rib has been heated to a molten state. With the use of a guide pin (having the proper dimensions of the anchor pin) placed through the openings, engagement by the die groove, in two stages, repositions the heated or molten opening areas to an original condition.

In addition to resizing the holes for the anchor pin, the invention affords, at the same operational site, an arrangement for reestablishing the proper contour or curvature of the brake shoe and, additionally, means for reestablishing the spacing between the ribs of the brake shoe, i.e. in a generally parallel relationship. Moreover, and to complete the resizing assembly, an arrangement of stops or blocks permit positive checking and/or placement of the brake shoe during the operational stages of reworking.

In any event, a better understanding of the present invention will become more apparent from the following description, taken in conjunction with the accompanying drawing, wherein FIG. 1 is a view in front elevation, partly in vertical section, showing a brake shoe resizer in accordance with the teachings of the present invention;

FIG. 2 is a view in side elevation of the instant invention, looking from right to left in FIG. 1;

FIG. 3 is a further view in front elevation, fragmentary in this instance, showing another location of the brake shoe during reworking, contrasting to the position illustrated in FIG. 1;

FIG. 4 is a plan view, partly in section, showing an anchor pin, or even a guide pin, when positioned within an opening in a brake shoe rib which has become misshapen from usage; and, FIG. 5 is another plan view, comparable to that of FIG. 4, showing the brake shoe rib after resizing.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, a typical brake shoe 10 generally comprises an arcuate base plate 10a and upstanding ribs 10b'—10b'' secured thereto. Each of the ribs 10b'—10b'' includes an opening or hole 10c through which a standard anchor pin extends during customary usage. The holes or openings 10c also serve to receive a gauge pin (not shown, but which determines any enlarging or misshaping of the holes 10c) and/or a guide pin 15 (used in the resizing operation described herebelow). In any event, FIGS. 4 and 5 readily demonstrate a rib hole or opening 10c before (FIG. 4) and after (FIG. 5) resizing.

The mechanism presented by the invention is typically defined by a framework 20 having a leg mounted support or work surface member 22 and, as well, a hydraulically operated die 25. The latter includes a hydraulic cylinder 26, with associated gauge 26a, and a power shaft 27 which moves the die 25 from the broken line position (of FIG. 1) to the full line positions of FIGS. 1, 2 and 3.

The overall arrangement, which need not be detailed herein, also includes, aside from the preceding, a control handle 30 selectively connecting hydraulic lines 32; a starter mechanism 34; a motor 35; a cover encased drive shaft 35a; and, a hydraulic fluid tank 37, with associated port 37a, communicating with the aforesaid hydraulic lines 32. The preceding, representatively shown in phantom, serve environmental purposes.

In any event, the die 25 has a centrally disposed groove 25a in its arcuate face (again see FIGS. 1, 2 and 3), where the shape of the groove 25a (and face) corresponds to the shape of the ends of ribs 10b'—10b'' of the brake shoe 10 being reworked. As a matter of readily determining whether the ribs 10b'—10b'' of the brake shoe 10 are in a proper upright or normal condition (with respect to the arcuate base plate 10a), framework 20, which supports hydraulic cylinder 26, includes guides 20a.

Restated otherwise, and during operation, when the brake shoe 10 is at one operational position (FIG. 1), the operator can visually determine whether or not the corresponding rib 10b' is properly oriented (with a guide 20a serving as reference), where the same visual inspection is attained at the other brake shoe rib 10b'' location of FIG. 3.

In this connection, and if the spacing between the ribs 10b'—10b'' is improper, as due to bending, such are placed in a straightening area defined by a block 28 and the support or work surface member 22. In other words, through hammering action, the spacing between the ribs 10b'—10b'' of the brake shoe 10 can be readily corrected. The preceding is apparent from the showing in the left hand portion of FIG. 1.

While also appropriate to reworking, attention is directed to the inverted upstanding arcuate member 29 shown in FIGS. 1 and 2. The latter provides a surface which presents a curvature corresponding to that of the brake shoe base plate 10a. If any correction is required, hammering or like forming can be achieved.

As to usage, and assuming the curvature of the base plate 10a and the ribs 10b'—10b'' of the brake shoe 10 being reworked are satisfactory, sizing of the openings 10c in the ribs 10b'—10b'' is accomplished by placing the brake shoe 10 on an arcuate receiving member 21 (see FIG. 2) on the framework 20. Actually, a rapid succession of operational steps is involved, to-wit, guide pin 15 is placed within the openings 10c in the ribs 10b'—10b'' of the brake shoe 10 (see FIGS. 1 and 3), either before or after one or both of the ribs 10b'—10b" is selectively heated to a molten state (depending upon condition).

As a matter of example, rib 10b" is properly positioned with respect to the groove 25a in the die 25, such being assured by a stop 20b' (see FIG. 1). Die 25 is then caused to be moved, hydraulically, into engagement with the molten rib area surrounding the hole or opening 10c. In other words, the die groove 25a reforms the opening 10c in the rib 10b" area around the guide pin 15.

A similar sequence of operational steps is involved with the opening 10c in the other rib 10b', i.e. the area around the opening 10c is heated to a molten state, the brake shoe 10 moved to the position of FIG. 3, i.e. adjacent another stop 20b", and die 25 caused to be selectively and hydraulically moved downwardly to contact the area surrounding the die shoe opening 10c. As stated, the opening 10c assumes the proper shape demonstrated in FIG. 5 rather than that illustrated in FIG. 4.

In other words, the invention affords a practical and yet convenient manner of resizing an existing brake shoe without complete replacement. Not only are the anchor pin 12 openings 10c dimensionally corrected, but, at the same site, the spacing between the ribs 10b'—10b" of the brake shoe 10 and the curvature of the brake shoe base plate 10a corrected and/or reworked. The operational sequence is relatively simple, where positive positioning of the brake shoe 10 being reworked is easily achieved through the usage of stops 20b'—20b" at each of the operational positions.

Obviously, when resizing has been completed, the guide pin 15 used for resizing is removed and the brake shoe 10 can be put back into normal operation on a vehicle. Thus, the invention affords a practical approach to the reworking of a brake shoe, minimizing operational requirements, and representing savings both in time and/or labor.

The brake shoe resizer described hereabove is susceptible to various changes within the spirit of the invention including, for example, in proportioning; the position of stops 20b'—20b"; and, the like. The preceding description, therefore, should be considered illustrative and not as limiting the scope of the following claims:

We claim:

1. An arrangement for resizing openings in a brake shoe having an arcuate base plate and upstanding ribs positioned on said arcuate base plate, said ribs each including an aligned opening for selectively receiving an anchor pin therebetween, comprising a framework, an arcuate member mounted on said framework receiving said arcuate base plate of said brake shoe, a framework mounted die overlying an edge area of one of said ribs proximate said opening and including a groove presenting a shape corresponding to that of said edge area, means selectively moving said die into engagement with said edge area surrounding said opening after the latter is in a preconditioned molten state, and a rigid one piece guide pin selectively extending within said opening prior to said engagement by said die.

2. The arrangement of claim 1 where separate stop means on said framework and adjacent said arcuate member selectively abut said arcuate base plate of said brake shoe in an alignment serving relationship between said edge area of one of said ribs and said die.

3. The arrangement of claim 1 where said framework supports an arcuate shaping member inverted with respect to said arcuate member and corresponding to the proper curvature of said arcuate base plate of said brake shoe.

4. The arrangement of claim 1 where said framework mounts another member presenting a thickness representing the proper spacing between said ribs of said brake shoe.

5. The arrangement of claim 1 where guide means on said framework above said arcuate member serve a height verifying relationship with said edge area of each rib of said brake shoe.

6. The arrangement of claim 1 where movement of said die is hydraulically controlled.

7. A method for resizing openings in a brake shoe having an arcuate base plate and upstanding ribs positioned on said arcuate base plate, said ribs each including an aligned opening for selectively receiving an anchor pin therebetween, comprising the steps of placing said arcuate base plate of said brake shoe onto a correspondingly shaped arcuate member mounted on a framework, disposing a framework mounted die having a groove of a shape corresponding to that of the edge area of a rib proximate one of said openings over said edge area, heating said edge area surrounding said one of said openings to a molten state, selectively extending a rigid one piece guide pin within said one of said openings after the surrounding area is in said molten state, moving said die into engagement with said edge area, and withdrawing said die and said guide pin after opening resizing is accomplished.

* * * * *